United States Patent [19]

Nijdam

[11] Patent Number: 5,237,866
[45] Date of Patent: Aug. 24, 1993

[54] FLOW SENSOR FOR MEASURING HIGH FLUID FLOW RATES

[75] Inventor: Paul J. B. Nijdam, Wageningen, Netherlands

[73] Assignee: Brooks Instrument B.V., Veenendaal, Netherlands

[21] Appl. No.: 698,317

[22] Filed: May 10, 1991

[51] Int. Cl.$^5$ .............................................. G01F 1/68
[52] U.S. Cl. ................................................. 73/204.11
[58] Field of Search ............ 73/204.11, 204.12, 204.27

[56] References Cited

U.S. PATENT DOCUMENTS

| | | | |
|---|---|---|---|
| 3,326,040 | 6/1967 | Walsh | 73/204 |
| 3,827,299 | 8/1974 | Welland | 73/204.12 |
| 4,519,246 | 5/1985 | Hartemink | 73/204 |
| 4,548,075 | 10/1985 | Mariano | 73/202 |
| 4,972,707 | 11/1990 | Nijdam | 73/204 |

FOREIGN PATENT DOCUMENTS 0342763  11/1989  European Pat. Off.

*Primary Examiner*—Michael T. Razavi
*Assistant Examiner*—R. L. Biegel
*Attorney, Agent, or Firm*—Kinney & Lange

[57] ABSTRACT

An apparatus for measuring the flow of fluid comprising a tube through which the fluid to be measured may flow, including means for varying the temperature at a selected location on the tube. A plurality of temperature sensors are used to measure the temperature at locations on the in flow end, that is upstream of the means for varying the temperature, and at least one sensor is used for measuring the temperature downstream of the selected location. A plurality of separate sensors are used on the input end to provide information to determine the temperature gradient along the tube. When the gradient is used in connection with the temperature sensed at known locations at the upstream and downstream section of the tube relative to the selected location that temperature differential is used to determine the flow of fluid. The tube preferably is secured to, or embedded in, a layer of material adapted to transfer heat between sections of the tube.

4 Claims, 2 Drawing Sheets

FLOW SENSOR FOR MEASURING HIGH FLUID FLOW RATES

BACKGROUND OF THE INVENTION

The present invention relates to a compact apparatus for measuring the flow of fluid through a conduit by sensing temperature differential at selected locations of the tube relative to a location on the tube where the temperature can be changed.

The general principle of passing a fluid, such as a gas, through a tube and determining the shift in the temperature profile of the tube on opposite sides of a location where the temperature can be varied has been known. It is also known that the extent of the shift is indicative of the flow rate, but the range of flow rates across which prior devices have been useful is limited.

My U.S. Pat. No. 4,972,707 shows a flow meter which provides for accurate measurements across a wide range of flows which can be used for both liquid and gaseous flows.

SUMMARY OF THE INVENTION

The present invention relates to an apparatus for measuring the flow of fluid which utilizes a tube, together with means for varying the temperature of the tube (heating or cooling) at a selected location along its length. The flow is passed from an inlet end past the selected location, to an outlet end. A layer of material is mounted in a thermal conducting relationship to at least a portion of the tube to transmit heat from a section of the tube in a direction substantially normal to the axis of the tube to another section of the tube. A temperature sensor is placed on the upstream or inlet side of the selected location, and another temperature sensor is placed on the downstream or outlet side of the selected location so that the differential in temperature, which varies as a function of fluid flow through the tube, can be used to sense the amount of flow. For accuracy, and quick response, the gradient of the temperature profile is sensed by at least one additional temperature sensor placed to permit establishing the temperature gradient along the input or output tube sections. As shown, a second pair of temperature sensors are used. Sensing the gradient of the temperature profile provides quick corrective signals to overcome the difficulties in linearity that can be encountered at high flows because of increasing thermal lag of the fluid with increasing flow. That is, the transfer of heat from the pipe to the fluid changes and the assumption that the temperature measurement on the output side of the sensor is linearly proportional to the heat flux, from which the mass flow can be obtained, is no longer accurate. The heat or temperature gradient on the input section of the tube and the output section of the tube relative to the selected location are linear, but the slope is different for different flows. By introducing at least one separate temperature sensing element and using two temperature measurements at spaced locations along the length of the flow sensor to provide a continuous sensing of the heat gradient, accurate compensation signals across a wide range of high flows can be obtained.

The sensor thus uses known principles, but achieves the ability to function across ranges of flows where thermal lag of the fluid affects the output of existing sensors.

DETAILED DESCRIPTION OF THE PREFERRED EMBODIMENTS

Figure 1:
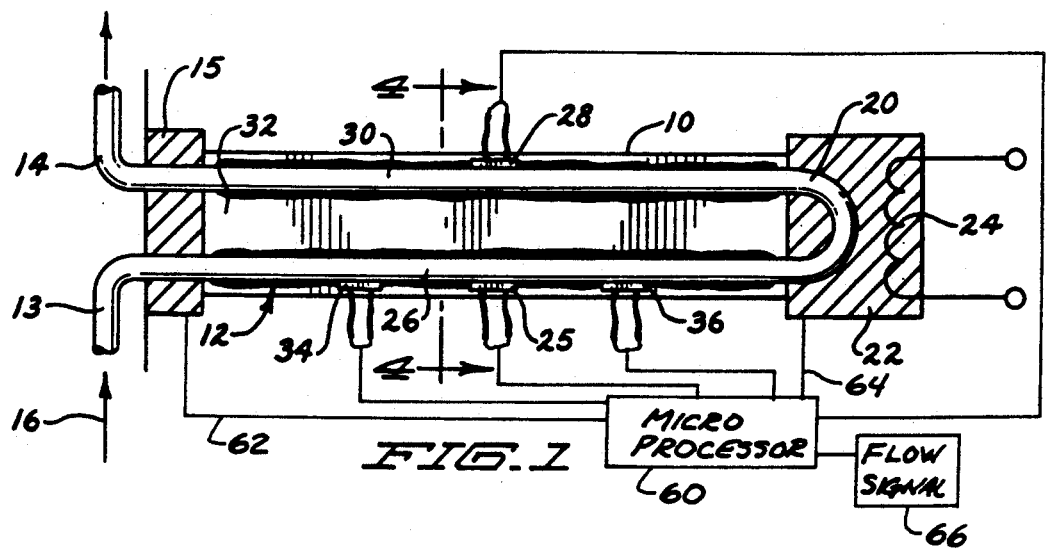
FIG. 1 is a schematic top plan view of an embodiment of the apparatus according to the present invention.

A sensor indicated generally at 10 comprises a tube 12 bent into a U-shape, and forming part of a conduit for a fluid, such as a liquid or a gas. An inlet end 13 of the tube and an outlet end 14 of the tube are mounted into an isothermal mounting block 15 that conducts heat between the inlet end 13 and the output end 14 to establish substantially the same temperature, $T_0$, at ends 13 and 14. The fluid flow is connected to the tube on the exterior of the block 15. A flow arrow 16 shows the direction of fluid flow into the inlet end 13 of the U-shape tube 12.

The U bend portion of the tube indicated generally at 20 is secured in a heat conducting relationship to a block 22, which is at a selected location along the tube 12 and which has a temperature altering element 24 installed therein. This can be a heater, such as a transistor or resistor, and the block 22 also can have a Peltier element therein that can cause cooling of the block 22. Heat conductance of the block 22 can be selected so that it will affect any fluid flowing through the tube 12 past the block 22. The tube 12, of course, is in a heat conducting relationship relative to the block 22.

A first temperature sensor 25 is attached in heat conducting relationship to an upstream section 26 of the tube 12, and a second temperature sensor 28 is attached to a downstream section 30 of the tube 12. Temperature sensors 25 and 28 are preferably platinum temperature sensors of selected design that are attached in good thermal conducting relationship to the tube. The temperature sensors 25 and 28 are symmetrically located with respect to the attachment of the block 22 to bend 20 of the tube 12, that is they are the same distance from the bend 20. The sensors 25 and 28 are used for detecting the temperatures at these locations of the tube 12. The temperature signals from the sensors can be transmitted to processing means (not shown) by suitable lead wires.

The tube 12 is fastened in mechanical and heat conducting relationship to a heat conductive foil or layer 32. The heat conducting layer 32 tends to conduct heat between the upstream section 26 and the downstream section 30 of the tube.

In this form of the invention, two additional temperature sensors indicated at 34 and 36, respectively, are positioned at equal distances along the tube 12 from, and on opposite sides of, the temperature sensor 25 or 28. These additional temperature sensors also are platinum resistance thermometers that will measure the temperature at spaced locations along the length of the input or upstream section 26 of tube 12. Also the output section 30 could be used.

The flow sensor as described can be used for determining the level of flow through the tube 12, by measuring the temperature differential at sensors 25 and 28, to determine the effect of the heat altering means of block 22 on the fluid carried in the tube. The heat conducting layer 32 between the tubes insures that heat is transferred between the upstream portion 26 of the tube and the downstream portion 30 of the tube.

With stationary fluid, that is, no fluid flow, a stable temperature profile is thus created, which in the ideal case extends along a substantially straight line from the beginning of the tube 12 at its block 14, to the end of the tube 12 at block 22. When fluid flows through the tube 12, the temperature profile will be shifted slightly relative to the straight line from the ideal case, due to the heat flows running substantially normal to the tube through the conducting material 32, and will remain substantially linear, but the temperatures of the two sections 26 and 30 of the U-shape flow meter will be offset, and the amount of the offset or shift ($\Delta T_y$) indicates the flow rate through the tube 12.

In my U.S. Pat. No. 4,972,707, the linearity of the system was enhanced by the use of a conducting guide strip or wire located midway between the upstream and downstream tube sections to keep the heat gradient constant. The strip worked well for lower flows, but at high flow rates, because of the thermal lag of the fluid, the linearity of the sensor was reduced. In the present invention, the temperature sensors 34 and 36 are used for sensing the gradient or slope of the temperature profile along the tube as the fluid flows through the tube. This can be done very rapidly and on line. The output temperature, $\Delta T_y$, is proportional to the flow and proportional to the temperature gradient. It will be noted that the slope or gradient of the temperature on both the upstream section 26 and the downstream section 30, relative to the temperature modifying or altering block 22, which is at temperature $T_1$, will be substantially the same as evidenced by the lines 42 and 44 in FIG. 3. The temperature signals from one additional sensor, for example sensor 34, and from sensor 25 also can be used to sense the heat gradient.

Figure 2:
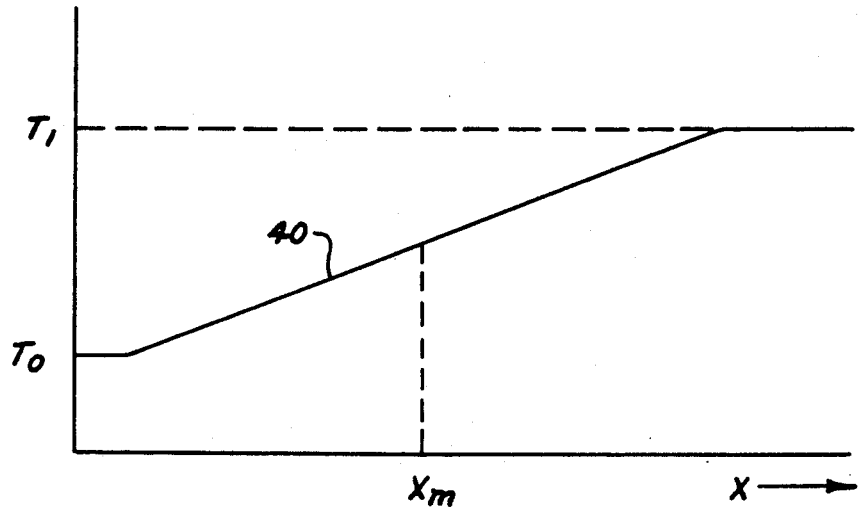
FIG. 2 is a graphical view illustrating the temperature profile along a length of the sensor of FIG. 1 in the absence of flow.

Now, referring to FIG. 2, the plot 40 indicates a stationary fluid or an empty tube profile, when the block 22 is functioning as a heater, and the element 24 is generating heat to raise the temperature level of the selected location 20 on the tube relative to the block 14. This is a straight line, and with the temperature elements 25 and 28 at the midpoint ($X_m$) of the tube sections 26 and 30, it can be seen that the temperature is between $T_0$ and $T_1$ at the midpoint.

Figure 3:
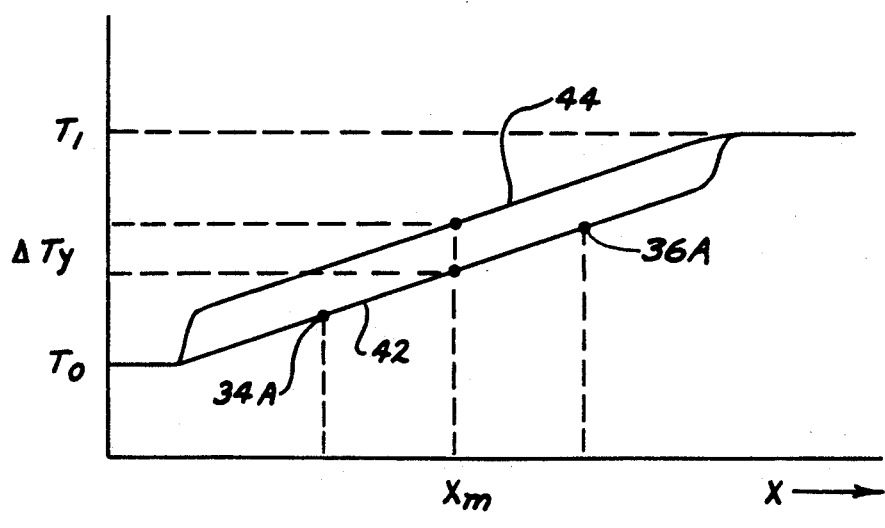
FIG. 3 is a graphical view of the temperature profile in a substantially ideal case in the presence of flow, illustrating a typical temperature gradient for a flow sensor at high flows.
Figure 4:
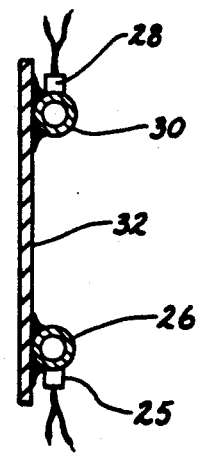
FIG. 4 is a sectional view taken as on line 4—4 in FIG. 1.

FIG. 3, on the other hand, illustrates the temperature profile in the event of a flow through the tube 12, with the line 42 representing the flow through the upstream section or inflow section 26, and the line 44 representing the temperature along the outflow or downstream section 30 of the tube. Owing to the conducting metal 32, the lines 42 and 44 are substantially linear along their lengths. The slope or gradient of these lines can be sensed by measuring the temperatures at two points represented at 34A and 36A on the line 42 which correspond to the portions of the temperature sensors 34 and 36. The heat gradient of the pipes can then be sensed at varying flows without having to take into consideration the lag in heat conduction to a center guideline that was used for enhancing linearity in U.S. Pat. No. 4,972,707. The guideline or center conducting block that is shown in U.S. Pat. No. 4,972,707 can be omitted when the heat gradient can be sensed by two temperature sensors.

Figure 5:
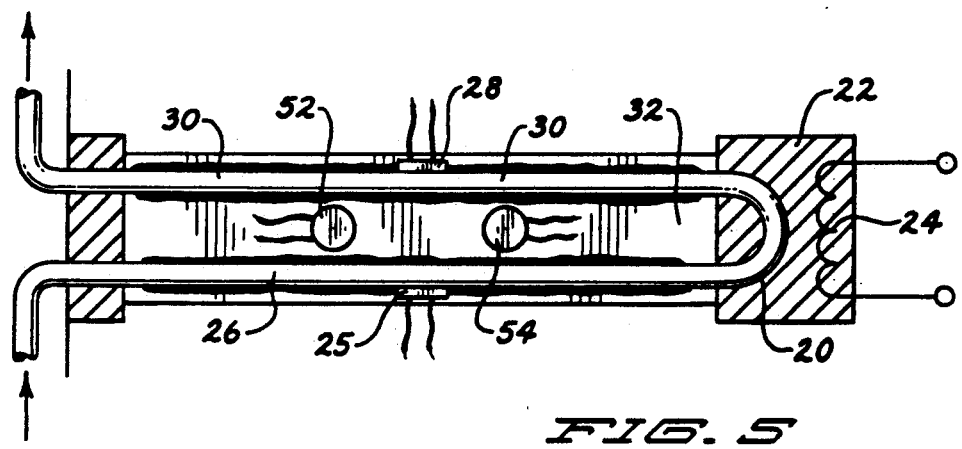
FIG. 5 is a schematic view of a modified form of the present invention.
Figure 6:
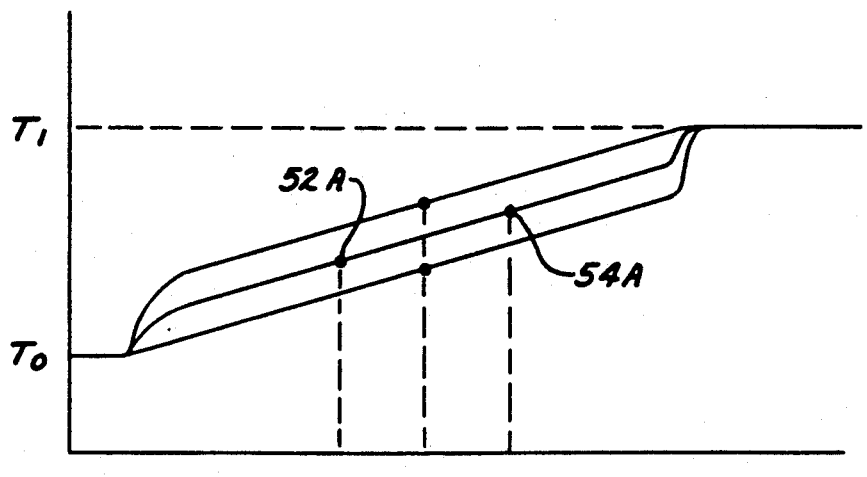
FIG. 6 is a graphical view of the temperature profile along the length of the sensor of FIG. 5.

FIG. 5 shows an alternate embodiment of the present invention, wherein the construction of the sensor 10 is essentially the same as in FIG. 1, with the upstream section 26 and downstream section 30 of the tube 12 carrying fluid flows, and with the temperature sensors 25 and 28 in the same position. However, in this instance, additional temperature sensors indicated at 52 and 54 are mounted symmetrically relative to the length of the tube from the center line on which the sensors 25 and 28 are placed, but they are midway between the sections 26 and 30 of the tube 12. As shown in FIG. 6, however, this senses the gradient of temperature as well, using these two individual sensors at temperatures indicated at 52A and 54A, so that the heat gradient, which varies with flow, can be obtained quite quickly, and without thermal lag involved when using an equalizing guideline as previously shown.

As seen in FIG. 6, the gradient can be measured either by placing the two separate sensors on the upstream tube section, the downstream tube section or in the middle of the two tube sections. In case of placing the separate sensors on the upstream or downstream tube, it is seen that the gradient also can be derived with only one extra sensor and the information from the sensor already used for the output signal (25 or 28). The requirement is to establish the gradient with two temperature measurements where the heat gradient is linear. It should also be noted that the tube sections 26 and 30 of tube 12 can be spiraled, rather than straight line tubes, and the same effect can be obtained as previously discussed in my prior patent.

The temperature gradient varies with flow and the signals indicating the gradient are used to provide adjustments for providing accurate flow indications in connection with the temperature difference at sensors 25 and 28.

In order to provide a flow output signal, a microprocessor 60 can be used for receiving the signals from sensors 25 and 28, and from at least one other sensor, for establishing the temperature gradient. As shown, the signals from sensors 34 and 36 are both used by the microprocessor. Temperature signals indicating the temperatures at blocks 15 and 22 may also be used, as sensed by sensors and provided along lines 62 and 64. Since the temperature gradient will be in part dependent on the difference in temperature at these blocks, the signals can be used for higher order corrections of the heat gradient signal, if desired. The microprocessor will have a stored calibration curve, derived from previous calibration sensors to provide a flow output 66 as a function of the difference between temperatures at sensors 25 and 28 ($\Delta T_y$) and the measured temperature gradient.

Apparatus shown in FIGS. and 5 can be surrounded by thermal insulation to isolate it from ambient temperature variations.

Although the present invention has been described with reference to preferred embodiments, workers skilled in the art will recognize that changes may be made in form and detail without departing from the spirit and scope of the invention.

What is claimed is:

1. An apparatus for measuring the flow of fluid moving at high flow rates comprising:

a tube for conveying a fluid to be measured therethrough;

means for varying a temperature of the tube at a selected location on the tube and providing an output signal thereof;

first and second temperature sensors at spaced positions from the means for varying the temperature for measuring the temperature of the tube at an upstream section of the tube relative to the selected location and a downstream section of the tube relative to the selected location, respectively, and providing a temperature signal thereof, the temperature signal being substantially linear along major portions of the respective upstream and downstream sections of the tube;

a thermally conducting material attached to the tube for conducting heat between at least a portion of each of the upstream and downstream sections of the tube;

at least one separate temperature sensor mounted in a heat conducting relationship to at least one of the upstream or downstream sections of the tube and positioned along said one section of the tube to permit sensing, in connection with the one of the first or second temperature sensors on the same section of the tube, a temperature gradient along said one section of the tube during fluid flow through the tube, and generating a compensation signal related to the temperature gradient when the means for varying the temperature is operating; and processing means for receiving the output signal, profile signal and compensation signal and computing flow rate of the fluid.

2. An apparatus as specified in claim 1, wherein said separate temperature sensor is mounted on the upstream section of the tube, and is spaced along the length of the upstream section of the tube from the first temperature sensor.

3. The apparatus as specified in claim 1, wherein the at least one separate temperature sensor comprises two temperature sensors, both located on the upstream section of the tube and spaced from the first temperature sensor.

4. The apparatus as specified in claim 1, wherein the tube is bent into a U-shape and the upstream and downstream sections of the tube are parallel tube sections, where there are two seperate temperature sensors which are mounted to the layer of material and located substantially midway between the length axes of the upstream and downstream sections, and also at equal distances on opposite sides of a line passing through the first and second temperature sensors.

* * * * *